Figures 1, 2:
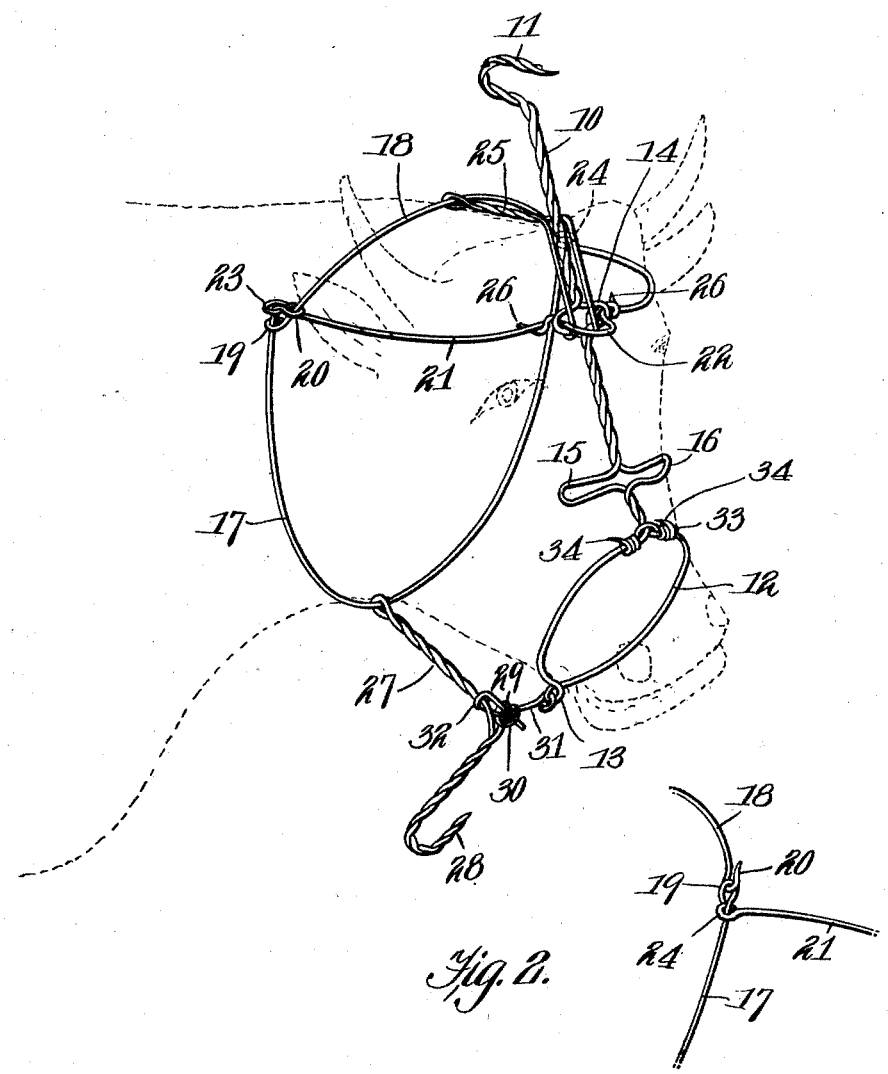

No. 760,493. PATENTED MAY 24, 1904.
H. A. SIMPSON.
ANIMAL POKE.
APPLICATION FILED JAN. 26, 1904.
NO MODEL.

Witnesses
E. J. Stewart
C. N. Woodward.

Herbert A. Simpson,
Inventor.
by C. A. Snow & Co
Attorneys

No. 760,493. Patented May 24, 1904.

UNITED STATES PATENT OFFICE.

HERBERT A. SIMPSON, OF SYCAMORE, KANSAS.

ANIMAL-POKE.

SPECIFICATION forming part of Letters Patent No. 760,493, dated May 24, 1904.

Application filed January 26, 1904. Serial No. 190,644. (No model.)

*To all whom it may concern:*

Be it known that I, HERBERT A. SIMPSON, a citizen of the United States, residing at Sycamore, in the county of Montgomery and State of Kansas, have invented a new and useful Animal-Poke, of which the following is a specification.

This invention relates to animal-pokes, and has for its object to provide a simple and efficient device having means for preventing the animals feeding either over or through a fence, while at the same time not interfering with the feeding in the ordinary manner.

Another object of the invention is to provide a device of this character which may be partially released when the animals are placed in stalls or stakes to permit them sufficient freedom for feeding without the necessity for removing the device from the head.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a perspective view of the device applied. Fig. 2 is a detail view illustrating the coupling portion of the device.

The improved device will preferably be formed entirely of wire bent into the required shape, and consists, primarily, of a bar 10 for extension longitudinally of the face of the animal, projecting above the head and terminating in a hook 11 at the upper extended end and with a nose-encircling band 12 at the lower end. The bar 10 will preferably be formed of two parts of wire entwisted together, with the nose-band 12 integral therewith and provided with a rear loop 13. The two parts of the bar 10 are bent apart at one point to form a central loop 14, and the parts are also bent apart and extended into lateral guards 15 16 to project across and partially around the nose of the animal to increase the steadiness of the bar.

A throat-band is provided which is formed of two U-shaped portions 17 18, having their adjacent ends formed into interengaging eyes 19 20, one of the pair of engaging eyes being detachable to enable the throat-band to be readily attached to and detached from the neck of the animal.

A forehead-band 21 is also provided in substantially V shape, with a central loop 22 for engaging the loop 14 and with its terminals formed with eyes 23 24 for engaging the throat-band.

The eye 20 on one side of the throat-band sections will preferably be looped about the adjacent sections, with the eye 23 connected between the eyes of the neck-band sections to prevent vertical movement, while leaving a sufficient degree of flexibility between the parts.

An overhead member 25 is provided, formed, preferably, of a single piece of wire looped centrally around the neck-section 18 and with the two parts entwisted and with the terminals threaded through the loop 22 outside the eye 14 and then coiled around the body of the forehead-band adjacent to the bar 10 and with their ends 26 extending inwardly to form spurs to prod the animal in the forehead when pressure is applied, as hereinafter more fully described.

Swinging from the neck-section 17 is an arm 27, preferably of a single piece of wire bent together centrally and with the two parts entwisted and terminating in a hook 28 and with a central socket formed by two lateral spaced loops 29 30 bent from one of the sides of the arm.

A link is movably connected by one end to the eye 13 in the nose-band 12 with its free end adapted to be detachably coupled to the socket by a bolt 32 slidable upon the arm 27.

A section of wire 33 is bent around the bar 10 adjacent to the nose-band 12 and with the sides coiled around the latter and with the ends 34 extending inwardly to form spurs to prod the nose of the animal when force is applied to the bar 10 or band 12, as hereinafter more fully explained.

When the improved device is applied to an animal, the upwardly-extending bar 10 and the depending arm 27, with its terminal hook 28 do not interfere with its ordinary movements while feeding or drinking; but any attempt to reach over a fence will cause the hook 28, to catch thereon and by means of the connecting-link 31 will draw the nose-band against the nose and press the spurs 34 upon the nose and cause the animal to instantly draw back.

If the animal attempts to protrude its head through the fence, the hook 11 will engage the wires and cause the points 26 to press into the forehead and likewise cause its withdrawal from the fence. By this means animals equipped with this improved device can feed neither over nor through the fence, while at the same time the device does not interfere with the freedom of the animal when feeding in the ordinary manner.

When the animals are placed in stalls, the bolt 32 is released, which permits the arm 27 to drop back, so that its presence will not interfere with the animals' feeding action and rendering it unnecessary to remove the poke at night or when the animals are in their stalls or stable.

The device is very simple in construction, can be cheaply manufactured, does not impart discomfort to the animals unless they attempt to pass through fences or like inclosing structure, and this discomfort is only temporary and disappears immediately upon the withdrawal of the animal.

The improved devices can be constructed of any size and adapted to all kinds of animals which require such attachments.

Having thus described the invention, what is claimed is—

1. In an animal-poke, a bar for extension longitudinally of the face and projecting above the head of the animal and terminating in a hook and having intermediately-disposed lateral guard members, and means for connecting said bar to the animal's head.

2. In an animal-poke a bar formed of two parts of wire entwisted longitudinally and with a hook at one end and a nose-encircling band at the other end, and means applied intermediately of the bar for connecting it to the head of the animal.

3. In an animal-poke a bar formed of two parts of wire entwisted longitudinally and with a hook at one end and a nose-encircling band at the other end and with intermediate laterally-extending guard-loops bent from the bar members, and means for connecting the bar to the head of the animal.

4. In an animal-poke a bar formed of two parts of wire entwisted longitudinally and with a hook at one end and a nose-encircling band at the other end and with an intermediate central loop formed by bending the bar members laterally, a forehead-engaging band having a loop engaging said central loop, and means for connecting said forehead-band to the neck of the animal.

5. In an animal-poke a bar formed of two parts of wire entwisted longitudinally and with a hook at one end and a nose-encircling band at the other end and with an intermediate central loop formed by bending the bar members laterally, a forehead-engaging band having a loop engaging said central loop, a throat-encircling band connected to the free ends of said forehead-band, and a stay member connected to said throat-band and with its free ends threaded through the loop in said forehead-band in advance of said bar-loop and forming a means for locking the forehead-band to the bar.

6. In an animal-poke a bar formed of two parts of wire entwisted longitudinally and with a hook at one end and a nose-encircling band at the other end and with an intermediate central loop formed by bending the bar members laterally, a forehead-engaging band having a loop engaging said central loop, a throat-encircling-band connected to the free ends of said forehead-band, and a stay member formed of a single piece of wire bent together and engaged to the throat-band by entwisting the sides and threading the free ends through the loop in the forehead-band in advance of the bar-loop and coiling the same about the forehead-band adjacent to the bar and with the terminals extending inwardly to form spurs to engage the animal's flesh when pressure is applied to the bar.

7. In an animal-poke, a bar for extension longitudinally of the face and projecting above the head of the animal and terminating in a hook, a throat-band formed of a lower section and an upper section having terminal inter-engaging loops, a forehead-band having terminal loops for engaging said throat-band at the juncture of its members, and a brace member connected by one end to said throat member and with its other end forming a connecting means between said forehead-band and said longitudinal bar.

8. In an animal-poke a bar formed of two parts of wire entwisted longitudinally and with a hook at one end and a nose-encircling band at the other end, said nose-band having a link movably connected thereto, a throat-encircling band having an arm swinging therefrom and terminating in a hook, and a bolt slidable thereon for detachably connecting said nose-band link to said swinging hooked arm.

9. In an animal-poke, a bar for extension longitudinally of the face of the animal and extending above the head and terminating in a hook and with a nose-encircling band at the lower end, a throat-band having a forehead-band connecting it to said longitudinal bar, an arm swinging from said throat-band and terminating in a hook and having an intermediate socket, a link swinging from said nose-band, and a bolt slidable upon said swinging arm for detachably coupling the free end of said link in said socket.

10. In an animal-poke, a bar for extension longitudinally of the face of the animal and extending above the head and terminating in a hook and with a nose-encircling band at the lower end, a throat-band having a forehead-band connecting it to said longitudinal bar, an arm formed of two parts of wire entwisted together and swinging upon said throat-band and terminating in a hook at its free end, said arm having an intermediate socket formed by bending one member of the arm laterally into spaced loops, a link swinging from said nose-band, and a bolt slidable upon said arm for detachably engaging the loops forming the sides of said socket and detachably coupling the link therein.

11. In an animal-poke, a bar for extension longitudinally of the face of the animal and extending above the head and terminating in a hook and with a nose-encircling band at the lower end, means for connecting said bar to the head of the animal, and a wire engaging said bar and with the ends coiled about the adjacent portions of the nose-band with its terminals extending inwardly and forming spurs to engage the nose of the animal when pressure is applied to the bar.

In testimony that I claim the foregoing as my own I have hereto affixed my signature in the presence of two witnesses.

HERBERT A. SIMPSON.

Witnesses:
FRANCES E. S. SIMPSON,
CALVIN H. STARR.